United States Patent [19]
Vik

[11] 3,874,411
[45] Apr. 1, 1975

[54] HYDRAULIC COUPLER ATTACHMENT

[75] Inventor: Albam M. Vik, New Brighton, Minn.

[73] Assignee: Dempco, Inc., Minneapolis, Minn.

[22] Filed: Nov. 15, 1973

[21] Appl. No.: 416,000

[52] U.S. Cl.......... 137/614.06, 137/271, 137/614.11
[51] Int. Cl......................... F16l 29/00, F16l 37/28
[58] Field of Search.......... 137/614, 614.01, 614.02, 137/614.03, 614.04, 614.05, 614.06, 614.11, 614.19, 269, 271; 285/DIG. 25; 251/148, 149.6, 149.9

[56] References Cited
UNITED STATES PATENTS
3,124,157  3/1964  Krzewina .................... 285/DIG. 25
3,680,591  8/1972  Vik ............................. 137/614.11

*Primary Examiner*—Charles J. Myhre
*Assistant Examiner*—Ira S. Lazarus
*Attorney, Agent, or Firm*—Dugger, Johnson & Westman

[57] ABSTRACT

An attachment for fluid line couplers to convert the standard check valve type couplers into a cam and lever operated coupler which provides an intermediate cam controlled valve assembly so that even though the fluid line may be under high pressure, the valve can be turned off and the line easily connected or disconnected with pressure on one or both of the coupler check valves. The attachment is made to connect onto existing male coupler nipples and will fit into standard conventional quick disconnect assemblies.

9 Claims, 6 Drawing Figures

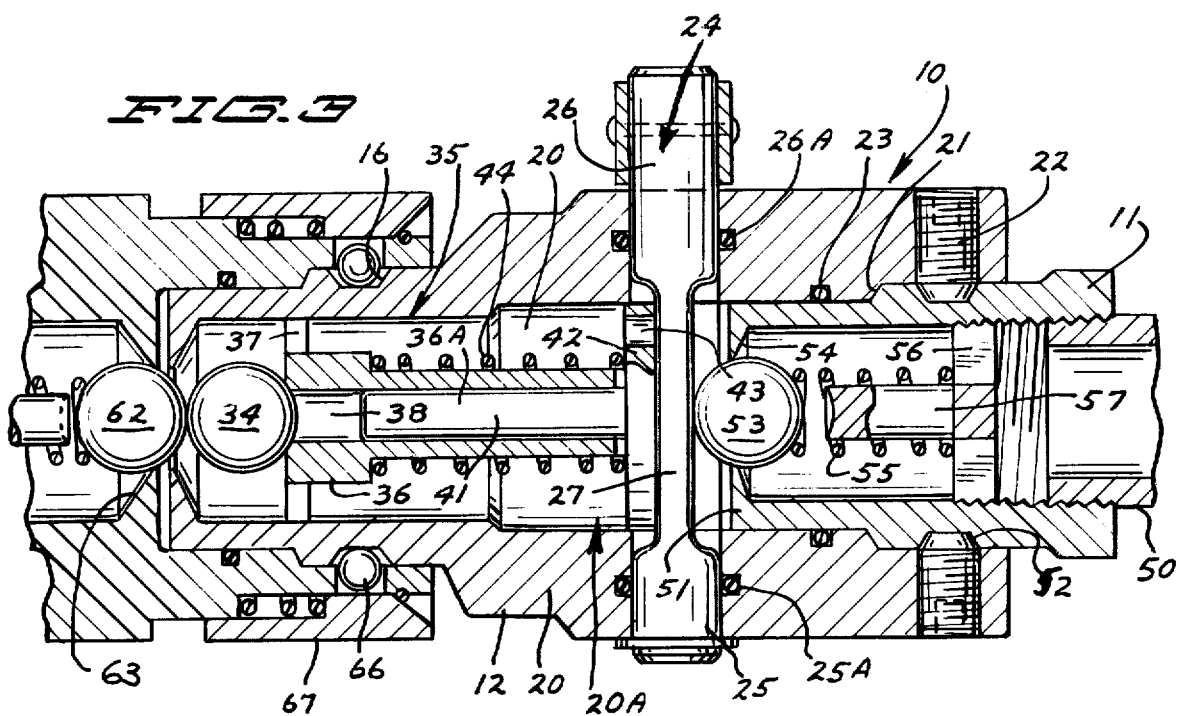
FIG. 3
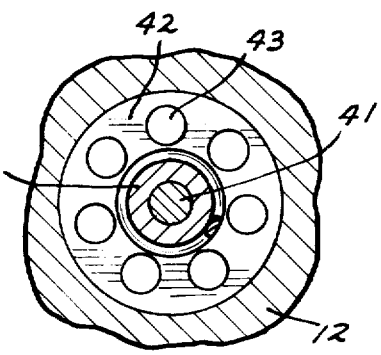
FIG. 5
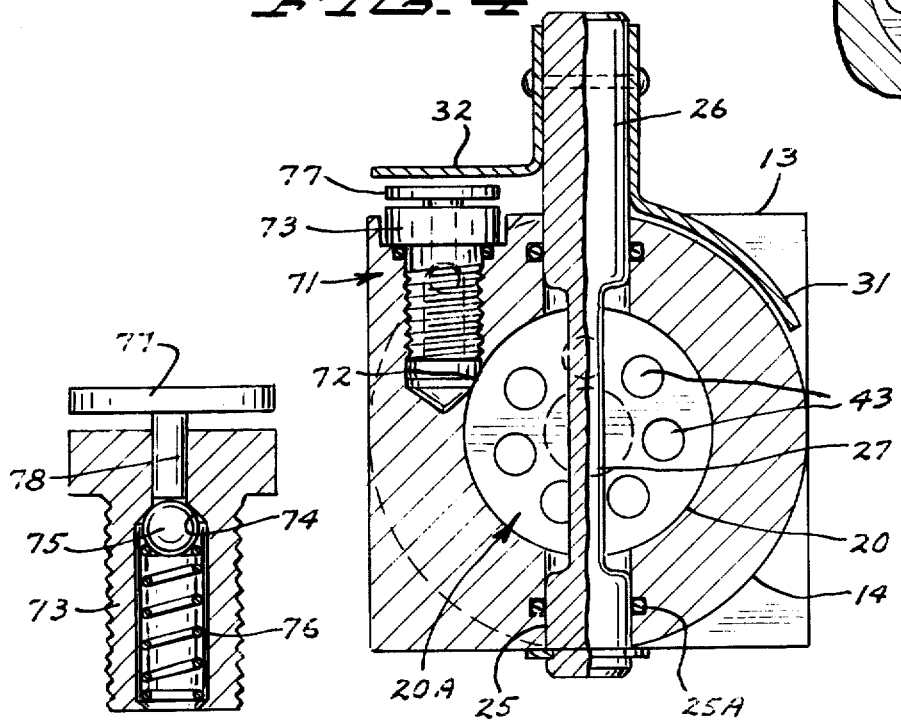
FIG. 4
FIG. 6

3,874,411

HYDRAULIC COUPLER ATTACHMENT

BACKGROUND OF THE INVENTION

1. Field of the Invention

The present invention relates to a cam operated secondary valve attachment for hydraulic or fluid line couplers.

2. Prior Art

The desirability of hydraulic couplers which can be operated to permit disconnection or connection of the coupler under high pressure differentials has been recognized. My U.S. Pat. No. 3,680,591, issued Aug. 1, 1972 shows a coupler body that has an intermediate valving assembly which permits such operation. Likewise, my U.S. Pat. No. 3,710,823, issued Jan. 16, 1973 shows a cam operated hydraulic line coupler which permits fluidly disconnecting and connecting two parts of the coupler without overcoming forces caused by line pressure.

SUMMARY OF THE INVENTION

The present invention relates to an attachment body for use with fluid couplers. The attachments include a cam or actuator and a secondary valve, and means to permit it to be installed on a coupler nipple which normally includes a check valve. The cam or actuator may then serve to actuate the check valve in the male nipple between open and closed positions. The body has an end configured to take the place of the nipple in a coupling which also has a check valve. By operating the cam, the coupler nipple check valve can be permitted to close, and the check valve from the coupling will be permitted to close. This will isolate a chamber between the secondary valve and the coupler nipple. Upon relieving pressure in this chamber the coupler members can be released without force from the check valves being exerted on the quick coupling members even when the lines are under pressure. For recoupling, the chamber is left at low pressure and the secondary valve retracts sufficiently to permit recoupling without moving the coupling check valve. Then the cam is moved to reopening the valves after the coupling has been made.

The attachment is light in weight to make it easy to mount and use and to prevent excessive forces or wear on the member on which it mounts. The length of the attachment is also kept to a minimum so that it can be easily used in existing applications.

Once the attachment is installed on a remote coupler nipple it also provides a safety shut-off which may be used to close the line even when the coupler is left assembled as well as permitting ease of recoupling if the lines are under pressure at the time of coupling and recoupling.

BRIEF DESCRIPTION OF THE DRAWINGS

FIG. 3 is a sectional view taken substantially on the same line as FIG. 2 showing the operating cam in a valve closed position;

FIG. 4 is a sectional view taken as on line 4—4 in FIG. 1;

FIG. 5 is a sectional view taken as on line 5—5 in FIG. 2; and

FIG. 6 is an enlarged sectional view of a suitable bleed valve than can be utilized with the coupler attachment of the present invention.

DESCRIPTION OF THE PREFERRED EMBODIMENT

Figure 1:
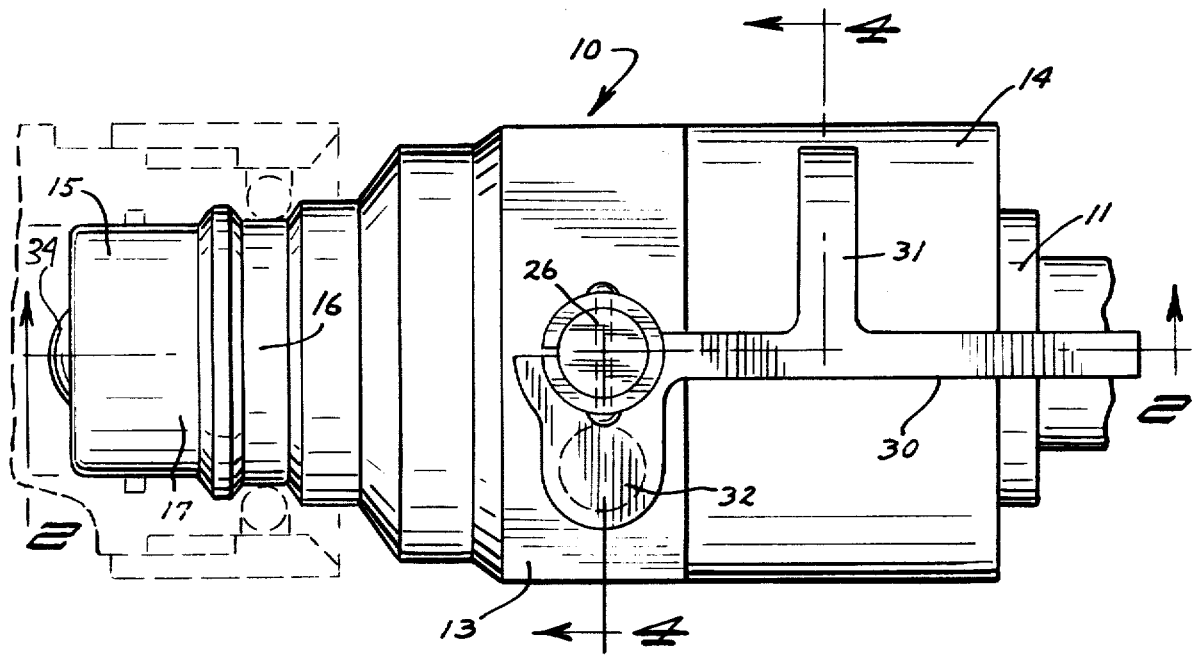
FIG. 1 is a top plan view of the coupler attachment made according to the present invention and shown installed on a coupler nipple, and with a female coupling member illustrated in dotted lines.

The coupling attachment illustrated generally at 10 is made as a separate body, and can be mounted on conventional quick attach fluid line couplers or hydraulic line couplers presently known in the art. For example, a standard nipple 11 of a hydraulic line coupler is used for mounting the attachment 10. The nipple 11 forms no part of the invention except to show how the attachment operates in combination with a nipple and with the coupling sleeve.

The attachment 10 is made out of a unitary body 12 of suitable material, such as steel, and it initially is started from square cross section stock. The body has a center section 13 that is still left square in cross section, and an end portion 14 that is machined round to save weight and make it more adaptable to existing couplings. It also has a nipple end 15 that is formed in the same configuration as the nipple 11 to which it is attached. This makes the nipple end 15 suitable for attaching into a coupling sleeve for a quick disconnect arrangement. As shown, the nipple end has a ball retainer groove 16, and a cylindrical outer sealing surface 17 adjacent its outer end.

The body 12 has an interior bore 20 defined therein, and at the end portion 14, it can be seen that this interior chamber includes a shoulder 21 that forms a larger inside diameter portion, and a plurality of radially threaded lock screws 22 are provided in the wall. These screws can be used for mounting the attachment 10 onto the nipple 11. The main portion of the bore 20 has an O-ring 23 provided in a groove for sealing on the surface of the nipple 11 when the nipple is coupled or held in place. In addition, a cross cam member 24 is mounted on the attachment body and extends across the square cross section portion 13. The cam extends transversely to the bore 20. The cam member 24 has cylindrical mounting portions 25 and 26, respectively, at opposite ends thereof, and a center cam portion 27. The mounting portions 25 and 26 are rotatably mounted in the body 12. As shown, the cam portion 27 comprises a flattened area in one diametral direction of the cam member while in the opposite diametral direction, the cam portion 27 extends the full diameter of the end portions 25 and 26. This cam portion 27 is shown in edge view in FIG. 3, and in its full diameter view in FIG. 2.

The mounting portions 25 and 26 are suitably sealed with O-rings 25A and 26A, respectively. The mounting portion 26 extends up above the outer surface of the center portion 13 of the body, and a handle 30 is mounted on this portion 26. The handle 30 is fabricated from two sections of sheet material that are fastened together along the longitudinal lengthwise axis of the handle, and one of the sections includes a part cylindrically extending stop member 31, that will engage the cylindrical surface 14 to prevent the handle 30 from turning in a clockwise direction as seen in FIG. 1 beyond the valve open position as shown, and the other section of the handle 30 includes a valve protector member 32 that covers a check valve when it is in its position as shown in FIG. 1 and also holds the valve in place during operation of the attachment. The purpose of the check valve will be apparent as the description proceeds.

The cam 24 is positioned at a selected axial distance from the set screws 22 so that a ball check valve from the coupler nipple 11 and a portion of which protrudes from the nipple will be in position to be actuated by the cam as also will be more fully explained.

On the internal bore 20 of the attachment 10 there is also provided a remote secondary valve seat 33, which surrounds an opening to the bore. A ball check valve 34 as shown is used with this seat. The ball check is oriented so that when it seats against the seat 33, the ball check valve will prevent flow out of the bore in direction away from the nipple 11.

Figure 2:
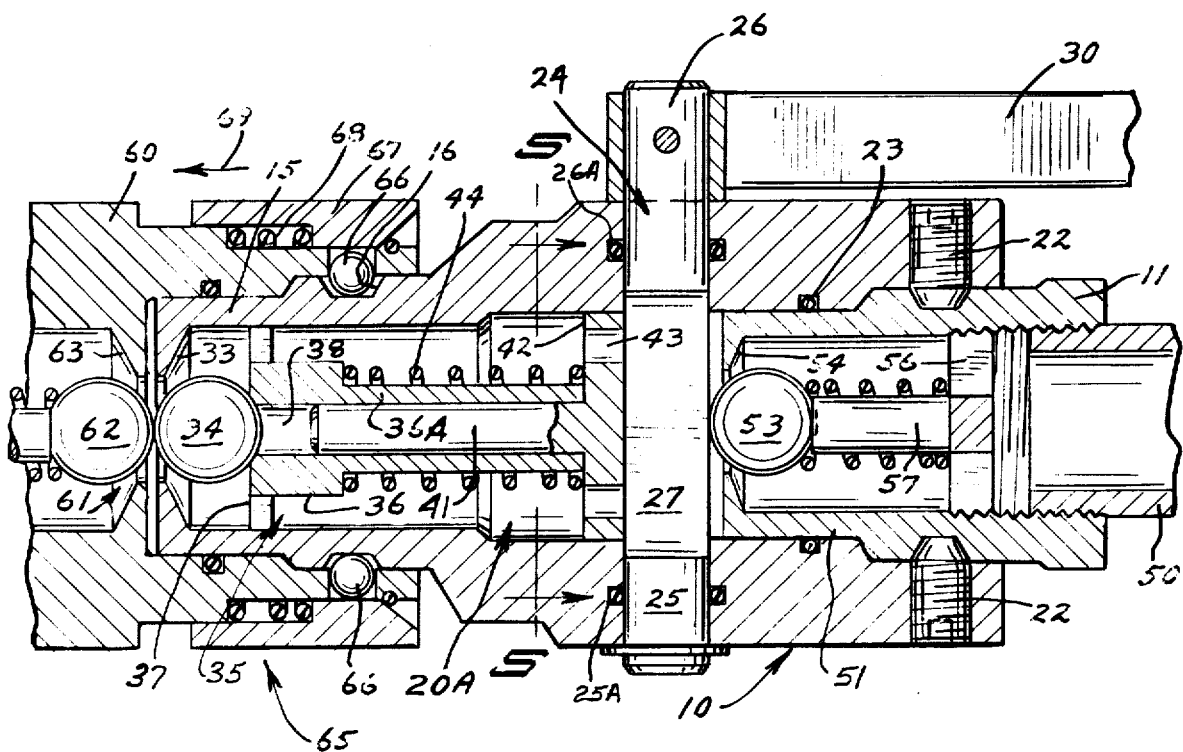
FIG. 2 is a sectional view taken as on line 2—2 in FIG. 1 shown with the complete coupler assembly in position.

The ball check valve 34 is associated with and trapped in place by a guide assembly illustrated generally at 35. The guide assembly includes a first ball guide member 36 that has a guide flange 37 that fits inside the bore 20 of the body 10, and which flange 37 has passageways defined axially therethrough so that fluid can flow through along the bore 20 through the openings in the guide flange 37. These openings can be through holes, or the guide can be made up of a plurality of radially extending strips. The guide member 36 has a tubular section 36A with a center opening 38 in which a guide rod or stem 41 of a cam follower is mounted. The guide rod is attached to a cam follower head 42 that is of size to fit within the bore 20 of the body 12 adjacent the cam member 24. The head 42 has a plurality of openings 43 therethrough to permit fluid to pass through the bore 20 as well. It should be noted that there is a good bit of space on the opposite sides of the cam member 24 so that fluid can flow past the cam without any substantial restriction. A spring 44 is provided to urge the cam follower 42 and the ball guide 36 apart. However, the elongated tubular portion 36A that guides the stem or rod 41 is made of length to limit the amount that the stem 41 can telescope. When the members 41 and 36A are compressed and telescoped as shown in FIG. 2, they will not collapse further. However, the ball guide is free to move toward seat 33.

The nipple 11 is connected to a remove fluid line or hydraulic hose 50, which would lead to a remote implement or hydraulic motor or the like that would be operated by fluid under pressure. The end portion 51 of the nipple 11 fits into the bore 20 of the body 12, and the O-ring 23 seals the nipple when it is in position. The set screws 22 are made so that they will engage a provided coupling groove 52 in the nipple 11, and this coupling groove is normally used for the quick release lock balls that are used conventionally in releasable hydraulic couplers. The interior of the nipple 11 mounts a ball check valve 53 that seats against a seat 54 surrounding an opening in the nipple, and the ball is urged toward this seat with a spring 55. The spring is mounted on a retainer 56 that is threaded into the interior of the nipple 11, and the retainer has a stud or rod 57 that prevents the ball 53 from moving away from its seat 54 more than a preselected amount. In other words the stud 57 provides a stop member for the ball 53 to prevent it from falling out of position. The stud also regulates the amount that the ball 53 can move away from the seat 54.

The ball 53 thus is urged toward the seat 54 as a check valve in the nipple. A portion of the check valve or ball protrudes out of the nipple when the ball is seated. It should be noted that when the cam is in the low cam position shown in FIG. 3 the ball 53 will seat against the seat 54 and flow will be prevented out of the hose 50 toward the cam. When the cam is in high cam or valve open position as shown in FIG. 2, ball 53 is mechanically and positively moved away from the seat 54 and fluid can flow in either direction past the ball 53.

As was previously mentioned, the end portion 15 of the attachment comprises a male end of size to duplicate the end of the standard nipple 11 on which the attachment is placed. Then, as can be seen in FIGS. 2 and 3, this male end 15 can be connected into a suitable coupler sleeve 60 that is a standard coupler used for coupling the nipple in a hydraulic line. This coupling sleeve is quite standard, and just by way of example, the coupler 60 has a check valve assembly 61 constructed substantially identical to that in the nipple 11. The coupler body has a wall 61 provided therein for the check valve, and a seat 63 is defined in the wall surrounding an opening in the wall. A ball check valve 62 seals on a seat 63 to check flow in opposite direction from the check valves 34 and 53. A spring and support stud are used with the ball 62 in the same manner as with the ball in the nipple 11.

The quick coupling connection for the attachment 10 shown generally at 65 is also of standard design and has a plurality of lock balls 66 mounted in radially extending openings in the end portion of the coupling sleeve, and these balls are of size to fit into the groove 16 of the male end of the attachment 10. The balls are held in place when a retractable sleeve 67 is positioned over the balls as shown in FIG. 2. The sleeve 67 is spring loaded with a spring 68 in the conventional manner, and can be retracted in the direction that is indicated by the arrow 69 to a position wherein the balls can move radially outwardly to clear the groove 16 so that the attachment 10 can be disconnected from the sleeve. This uncoupling can be done automatically from external pull on hose 50 in conventional ways or may be manual. It is the connection and disconnection of remote line from the coupling sleeve 60 that is simplified when the attachment 10 is in place, as compared with the connection and disconnection or an ordinary nipple 11 with respect to coupling sleeve 60. It can be seen that the coupling sleeve bore is of size and configuration to receive the male end 15 of the attachment.

The valve seat 33 and the end of nipple 11 define a central chamber 20A in the bore 20. The chamber 20A is provided with a relief check valve assembly shown generally at 71. This relief check valve assembly is mounted in an opening which opens at passageway 72 to the bore 20, adjacent to the cam head 42, and, it will be seen, inwardly from the end of the male coupling 11 so that the check valve assembly 71 opens to the interior chamber 20A in the bore 20 between the valve seat 33 and the end of the male nipple 11. The valve assembly 71 as shown comprises a threaded sleeve 73 that has an interior passageway having surfaces defining a ball seat 74, and a ball 75 that will seat against this ball seat is also provided. A spring 76 is used for urging the ball 75 against the seat 74. A small plunger 77 is mounted in the member 73, and has a rod 78 that will pass into an opening that aligns with the ball 75. When the plunger is in a raised position, the ball can be urged by the spring 75 against the seat 74, and this will prevent fluid from escaping through the check valve assembly 71 to the exterior of the attachment 10 unless the plunger 77 is depressed. The valve guard 32 is made so that it will prevent the plunger from falling out of the valve assembly. The plunger 77 could also be retained in the valve assembly in other ways such as with a small pin that permitted the plunger to slide but kept it in place.

The opening 72 is thus in fluid communication with the chamber 20A of the bore 20 adjacent the cam, and pressure in this chamber 20A will cause the ball 75 to seat against the seat 74 to prevent leakage until the plunger 77 is depressed.

In operation, the attachment 10 can be placed onto the nipple 11, by turning the cam to off or low cam position and placing the body 12 into position as shown in FIG. 2, and then securing the set screws 22 so that they fit into the groove 52 of the nipple 11. The low cam position is shown in FIG. 3. The check valves 53 of nipple 11 will be seated against the seat 54 and there will be no need to open this check valve. Therefore it is apparent that this attachment of the body 12 onto the nipple 11 can be done even if there is pressure in the hose 50. Pressure in hose 50 forces the ball 53 tightly against the seat 54.

Assuming that the attachment is mounted on nipple 11 and the cam is in its position as shown in FIG. 3 (which is the ball seated position) the ball 34 would normally be urged by the spring 44 against the seat 33. The cam can be left in its off position. It can be seen that the guard member 32 is of size and shape so that it will continue to cover a portion of the head of the plunger 77 and prevent the plunger from escaping even in off position. Now, just by way of example, assuming that a pressure had built up in the chamber 20A, the ball 34 which was in the example seated against the seat 33, and the end of the nipple 11, the plunger 77 could be pushed manually (the guard 32 leaves a portion of the plunger exposed when the cam is in its off position at 90° to the position shown in FIG. 1) to relieve any pressure in the chamber 20A. Only a very small volume is needed to reduce the pressure, and also because there is no substantial compressibility to the fluid, only a very little fluid escapes in order to relieve the pressure in the chamber 20A. When the pressure has been relieved in the chamber 20A, the plunger 77 could be held down, and then the end potion 15 inserted into the coupling sleeve 60 (with collar 67 retracted to permit balls 66 to retract). Assuming that the ball 62 is against its seat 63 as shown in FIG. 3, the ball 34 will be moved away from its seat 33 against the spring force from spring 44 (which is greater than the spring force on ball 34). The movement of the ball 34 will not result in any great increase in pressure in the chamber 20A, although if there is an increase the plunger 77 can be held depressed while the coupling action is taking place. There would perhaps be a slight displacement of oil from the chamber 20A by the intrusion of the ball 62 partially into the chamber 20A as shown in FIG. 3 in solid lines. However, the coupling can be easily made because the ball 62 does not have to be unseated, nor will the ball 53 from nipple 11 be unseated during this coupling action. Thus there can be pressure either in the input line to the nipple 61, or the line 50 to the nipple 11 without any adverse affect on the coupling action.

Then, when the unit is coupled, the cam 24 can be moved to its valve open position, and as can be seen in FIG. 2, the cam portion 27 will move the ball 53 away from its seat 54 and the head 42 will be moved so that it engages the end of the sleeve 36A and forces the member 36, and the ball 34 in direction toward the nipple 61. This will force the ball 62 away from its seat 63 to position as shown in FIG. 2. The entire coupling then will be open for fluid flow from the source, which is connected to the nipple 61 to the remote line 50. Of course fluid can flow in either direction when the cam is in its high or valve open position as shown in FIG. 2.

If the lines which are coupled are under pressure for example and disconnection is desired, the cam is merely moved to its closed position as shown in FIG. 3. The ball 53 will seat, and also ball 62 will be permitted to seat. The spring 64 will be of less force than the spring for ball 34. The plunger 77 would be depressed to relieve pressure in the chamber 20A, and the unit can easily be disconnected by pulling the sleeve 67 to its retracted position so that the ball 66 can move out of the groove 16 and release the attachment 10. As can be seen the pressure in the line 50 would be trapped by the seating of the ball 50 against its seat, and any pressure in nipple 61 would likewise be trapped by ball 62 sealing on seat 63. The ball 62 is also kept from moving too far from seat 63 by a retainer similar to stud 57.

The attachment 10 is kept short, and this is made possible by use of the fixed attaching set screws 22, so that there is no great leverage on its mounting to the nipple 11 tending to cause the nipple 11 to cock in the bore 20 or to otherwise be skewed so that there was not adequate seating of the nipple 11. Further, the weight is kept light by machining away material where it is not needed. The unit is hollow so that its weight is minimized as well.

Many methods of attaching the attachment 10 to a nipple 11 can be utilized, for example, disconnect sleeve, a snap ring, or other suitable attaching devices is envisioned. The attachment 10 can be separately made, and the nipple 11 as well as the coupling sleeve 60 are all standard components presently in use in the field. When a standard coupling that cannot be shut off with a cam is purchased, the operator only has to purchase the attachment 10 to convert his standard coupling into a cam valve coupling that can be made to permit uncoupling and coupling of the remote hose from the pressure source while there is pressure in the line without losing a great deal of oil as is done when an ordinary coupling is disconnected under pressure, and also will permit recoupling while there is still pressure in the line. In ordinary couplers when there is pressure in the lines, it is extremely difficult to recouple because the force of this pressure against the ball checks has to be overcome for the coupling action.

The attachment thus is a unit that can mount onto existing couplings to give the benefits of an intermediate valving device that is cam operated to permit shutting off of the coupling, and uncoupling and coupling with no pressure or force being exerted on the coupling members during this action.

What is claimed is:

1. In combination with a fluid line check valve coupling assembly including a male nipple a fluid flow control attachment and a female coupling member having a quick release coupling assembly for holding said fluid flow control attachment which receives an end portion of said male nipple said male nipple having a first check valve therein, said first check valve including means extending externally of said male nipple, the improvement comprising said fluid flow control attachment for said male nipple including a body member having a first end forming a female receptacle for said end portion of said male nipple and a second end having an outer surface configured to be substantially identical to the outer surface of said end portion of the male nipple, a bore through said body member, means to attach a first end of said body member to said male nipple, whereby said end portion of said male nipple is seated in said female receptacle, a cam mounted in said body member and movable between a valve open position and a valve closed position, a portion of said cam being of size to engage said means extending externally of said male nipple to move said first check valve to an open position when said body member is attached to said male nipple and said cam is in said valve open position, said first check valve being movable between said open position and a closed position, a second check valve seat defined in said body member, and a second check valve cooperating with said second check valve seat and being operable to check fluid flow in the same direction of flow as that checked by said first check valve, said second check valve and second end of said body being substantially identical to said end portion of said male nipple, and means between said second check valve and said cam to prevent movement of said second check valve away from said check valve seat more than a preselected amount when the cam is in said valve open position holding said first check valve open, and said cam being configured to permit said first check valve to close when the cam is moved to said valve closed position, said second check valve then being permitted to move to position spaced from said valve seat a greater distance than said preselected amount.

2. The combination specified in claim 1 wherein said female member of said coupling assembly includes a third check valve preventing flow opposite flow direction from said first and second check valves, said quick release coupling assembly mounting said second end of said body member adjacent said third check valve, and means between said cam and said third check valve to mechanically open said third check valve when said cam moves to its valve open position.

3. The combination of claim 2 wherein said means between said cam and third check valve comprises a cam follower member and a valve guide member mounted for movement in said bore and including means to limit the amount said cam follower and valve guide can move toward each other.

4. The combination of claim 3 wherein said means between said cam and said third check valve further includes a portion of said second check valve.

5. The combination specified in claim 1 wherein said means to attach said body to said male nipple comprises threadable set screw means on the body member threadable to mechanically engage portion of said male nipple.

6. The combination specified in claim 1 and a manually operable bleed valve member open to the bore of said body member in position between said first check valve and said second check valve.

7. An attachment for fluid line male check valve nipples used in fluid line coupler assemblies comprising a female coupler member including a body member having first and second ends, a bore through said body member, said first end of said body member comprising a receptacle configured to receive a portion of a check valve nipple, having an annular groove on the outer periphery thereof which comprises a means for attaching said check valve nipple to a fluid line coupler, set screw means extending from the exterior of the body member to fit into the receptacle adjacent said first end of said body member to permit fixedly attaching said body member to an end portion of said check valve nipple and being threadable into the annular groove of said check valve nipple in said receptacle, a cam mounted in said body member adjacent said first end, said cam being movable to a valve open position to engage and open said check valve nipple when attached to said body member, a portion of said body member adjacent said second end having an outer surface substantially identical to an end portion of said check valve nipple used with a coupler and comprising a second check valve nipple having a check valve to normally prevent flow through said bore in direction from said first end toward said second end and upon opening movement thereof said second check valve moves in a direction from the second end toward the first end of said body member, and means between said second check valve and said cam to selectively prevent opening movement of said second check valve more than a preselected amount when the cam is in said valve open position, said cam being movable to a valve closed position permitting said check valve nipple attached to said body to close and permitting said second check valve to move a greater distance toward said first end than when the cam is in its valve open position, said second end of said body being mountable in a coupler for a fluid line coupler assembly.

8. The combination specified in claim 7 and selectively operable fluid bleed means open to said bore.

9. The combination of claim 8 wherein said fluid bleed means comprises a bleed check valve member normally preventing fluid movement from said bore, and manually movable means external said body member operable to open said bleed check valve to permit fluid to flow from said bore.

* * * * *